US012590598B2

(12) United States Patent

Lu et al.

(10) Patent No.: US 12,590,598 B2

(45) Date of Patent: Mar. 31, 2026

(54) LOCKING ASSEMBLY

(71) Applicant: Fulian Precision Electronics (Tianjin) Co., LTD., Tianjin (CN)

(72) Inventors: Wen-Hu Lu, Tianjin (CN); Li-Yi Yin, Tianjin (CN); Shu-Tong Wang, Tianjin (CN)

(73) Assignee: Fulian Precision Electronics (Tianjin) Co., LTD., Tianjin (CN)

( * ) Notice: Subject to any disclaimer, the term of this patent is extended or adjusted under 35 U.S.C. 154(b) by 378 days.

(21) Appl. No.: 18/209,513

(22) Filed: Jun. 14, 2023

(65) Prior Publication Data

US 2024/0125340 A1 Apr. 18, 2024

(30) Foreign Application Priority Data

Oct. 18, 2022 (CN) .......................... 202211275465.9

(51) Int. Cl.
*F16B 5/06* (2006.01)
*F16B 21/09* (2006.01)
*F16B 21/12* (2006.01)

(52) U.S. Cl.
CPC ............ *F16B 5/0664* (2013.01); *F16B 21/09* (2013.01); *F16B 21/125* (2013.01); *Y10T 403/595* (2015.01); *Y10T 403/598* (2015.01)

(58) Field of Classification Search
CPC .... F16B 5/0642; F16B 5/0664; F16B 19/109; F16B 21/09; F16B 21/125; Y10T 403/59; Y10T 403/591; Y10T 403/595; Y10T 403/597; Y10T 403/598; Y10T 403/599
See application file for complete search history.

(56) References Cited

U.S. PATENT DOCUMENTS

| | | | | |
|---|---|---|---|---|
| 3,794,265 A | * | 2/1974 | Jantzen | G11B 15/662 |
| | | | | 403/324 |
| 5,975,822 A | * | 11/1999 | Ruff | B64D 11/0696 |
| | | | | 411/85 |
| 7,192,149 B2 | * | 3/2007 | Lai | G02F 1/133608 |
| | | | | 362/225 |
| 7,429,143 B2 | * | 9/2008 | Tyski | F16B 21/09 |
| | | | | 24/104 |

(Continued)

FOREIGN PATENT DOCUMENTS

| | | | | |
|---|---|---|---|---|
| CN | 105840604 A | * | 8/2016 | .............. F16B 21/08 |
| TW | M582083 U | | 8/2019 | |

*Primary Examiner* — Amber R Anderson
*Assistant Examiner* — Kevin J Baynes
(74) *Attorney, Agent, or Firm* — ScienBiziP, P.C.

(57) ABSTRACT

A locking assembly can lock a workpiece. The workpiece includes a locking hole. The locking assembly includes a housing, a movable component, and an unlocking handle. The movable component includes a sleeve, a pin, and an unlocking cover. The sleeve is mounted on the housing. The pin is accommodated in the sleeve, and a portion of the pin protrudes from the housing and accommodated in the locking hole. The unlocking cover is fixed to the pin. The unlocking handle is disposed between the unlocking cover and the sleeve. The unlocking cover can be pulled from a first direction to move the pin out of the locking hole; or the unlocking handle can be pulled from a second direction intersecting with the first direction, and the unlocking handle can abut against the unlocking cover to drive the pin to move out of the locking hole.

8 Claims, 6 Drawing Sheets

(56) References Cited

U.S. PATENT DOCUMENTS

| | | | | |
|---|---|---|---|---|
| 8,393,840 | B2 * | 3/2013 | Chiu | F16B 5/0266 |
| | | | | 411/353 |
| 8,505,986 | B2 * | 8/2013 | Sun | H01M 50/20 |
| | | | | 292/137 |
| 9,562,549 | B2 * | 2/2017 | McClure | B64C 1/066 |
| 9,967,985 | B2 * | 5/2018 | Huang | F16B 5/0664 |
| 10,047,779 | B2 * | 8/2018 | Wang | F16B 21/09 |
| 10,319,413 | B2 * | 6/2019 | Wang | G11B 33/08 |
| 11,719,271 | B2 * | 8/2023 | Wang | F16B 19/06 |
| | | | | 411/378 |
| 11,739,787 | B2 * | 8/2023 | Zhu | G03B 17/561 |
| | | | | 396/428 |
| 11,892,028 | B2 * | 2/2024 | Chang | F16B 5/00 |
| 12,158,177 | B2 * | 12/2024 | Wang | F16B 21/09 |
| 2020/0340514 | A1 * | 10/2020 | Wang | F16B 19/1027 |
| 2020/0367669 | A1 * | 11/2020 | Wang | A47G 1/21 |
| 2021/0010499 | A1 * | 1/2021 | Wang | F16B 5/0642 |
| 2022/0325560 | A1 * | 10/2022 | Uram | E05B 9/002 |
| 2022/0403868 | A1 * | 12/2022 | Wang | F16B 21/125 |

* cited by examiner

LOCKING ASSEMBLY

FIELD

The subject matter herein generally relates to fixing, and more particularly, to a locking assembly.

BACKGROUND

A device may be locked with a locking assembly to prevent unexpected displacement of the device. When the device needs replacement, it is necessary to unlock the device and the locking assembly. However, the device may only be unlocked along a single direction, and the single unlocking direction may not be applied to some scenarios with limited space. Therefore, there is a room for improvement in the art.

BRIEF DESCRIPTION OF THE DRAWINGS

Implementations of the present technology will now be described, by way of example only, with reference to the attached figures.

DETAILED DESCRIPTION

Figure 1:
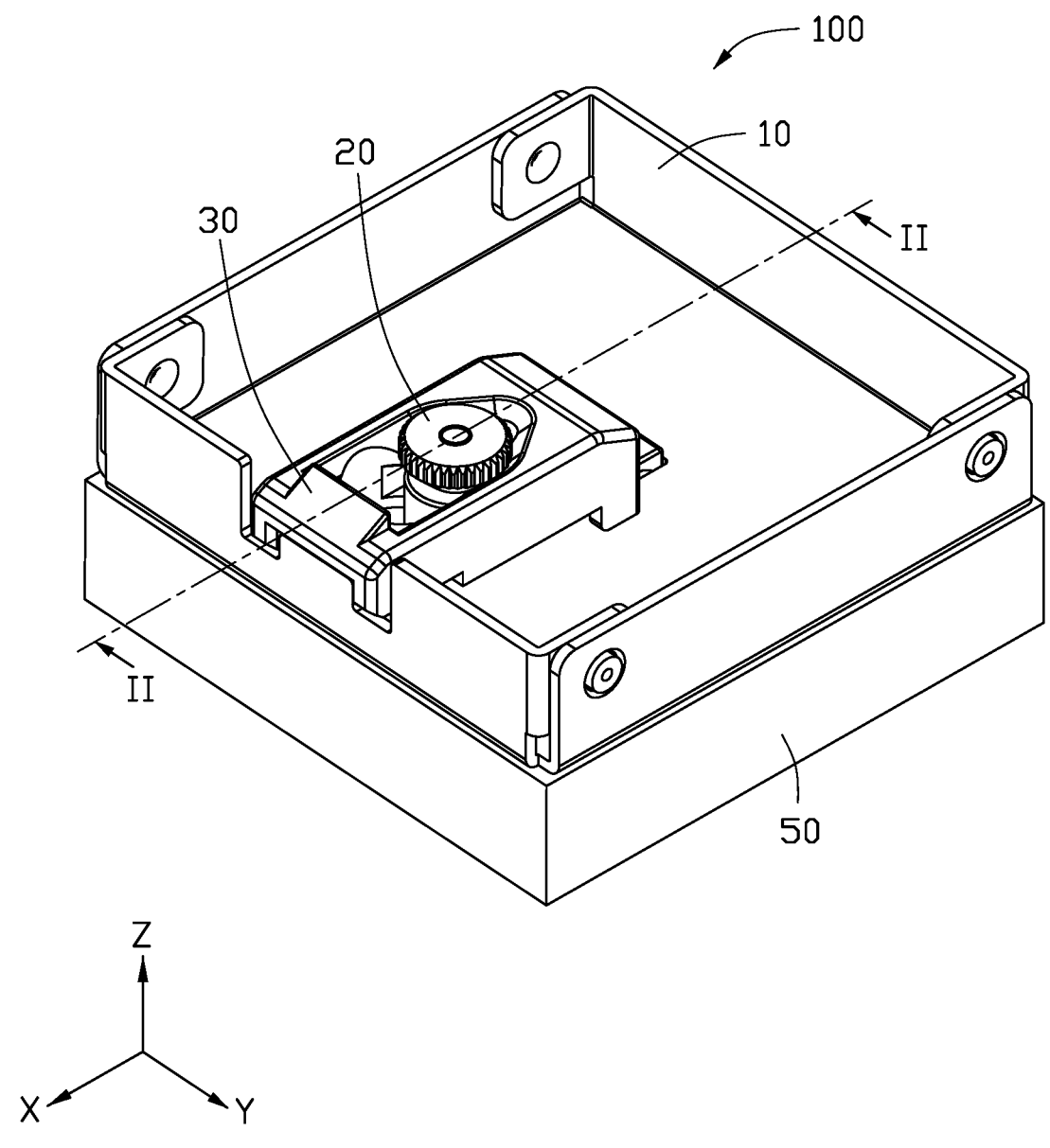
FIG. 1 is a diagrammatic view of an embodiment showing a workpiece locked by a locking assembly according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series, and the like.

Some embodiments of the present disclosure will be described in detail with reference to the drawings. If no conflict, the following embodiments and features in the embodiments can be combined with each other.

Figure 2:
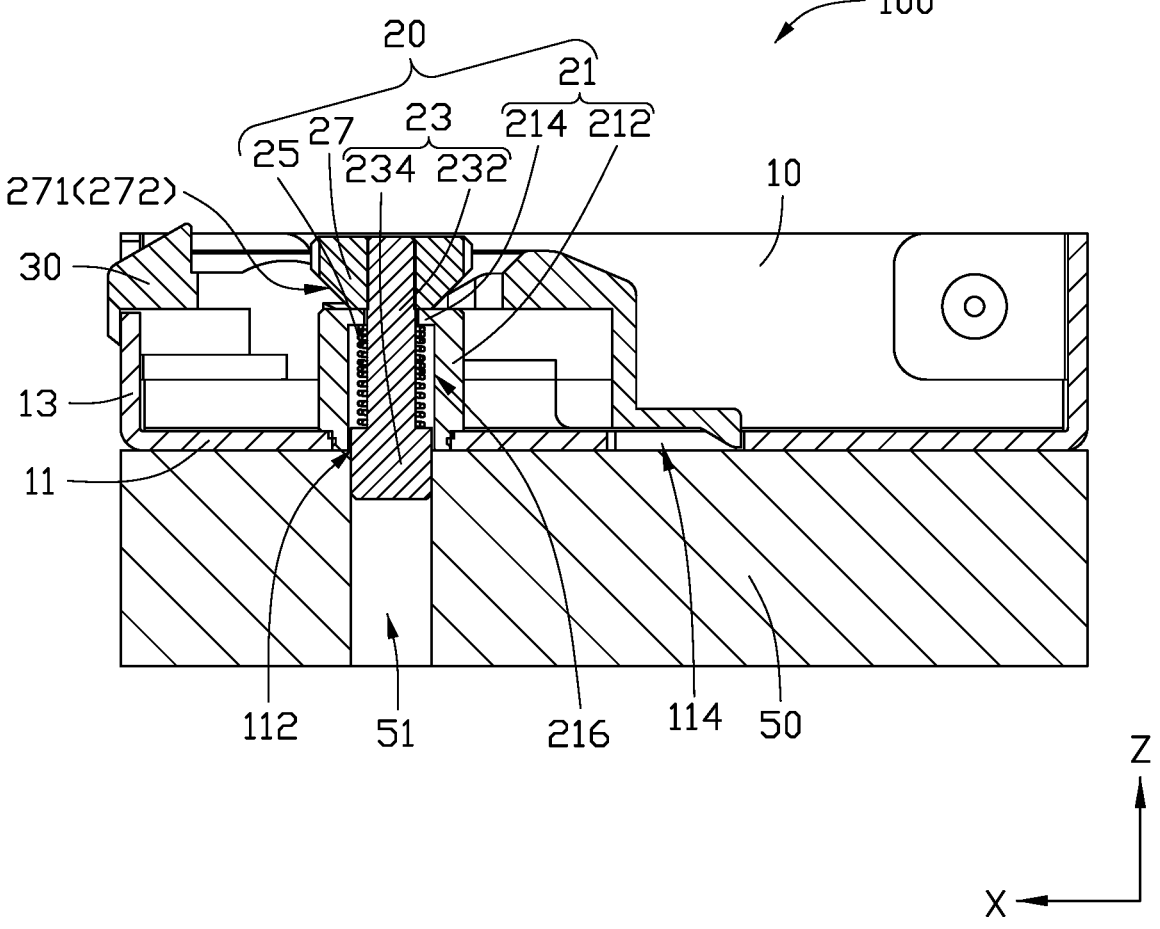
FIG. 2 is a cross-sectional view of the workpiece locked by the locking assembly of FIG. 1 taken along line II-II.

Referring to FIGS. 1 and 2, a locking assembly 100 is provided according to an embodiment of the present disclosure. The locking assembly 100 can lock a workpiece 50, and the locking assembly 100 can also unlock the workpiece 50 from two directions.

Figure 3:
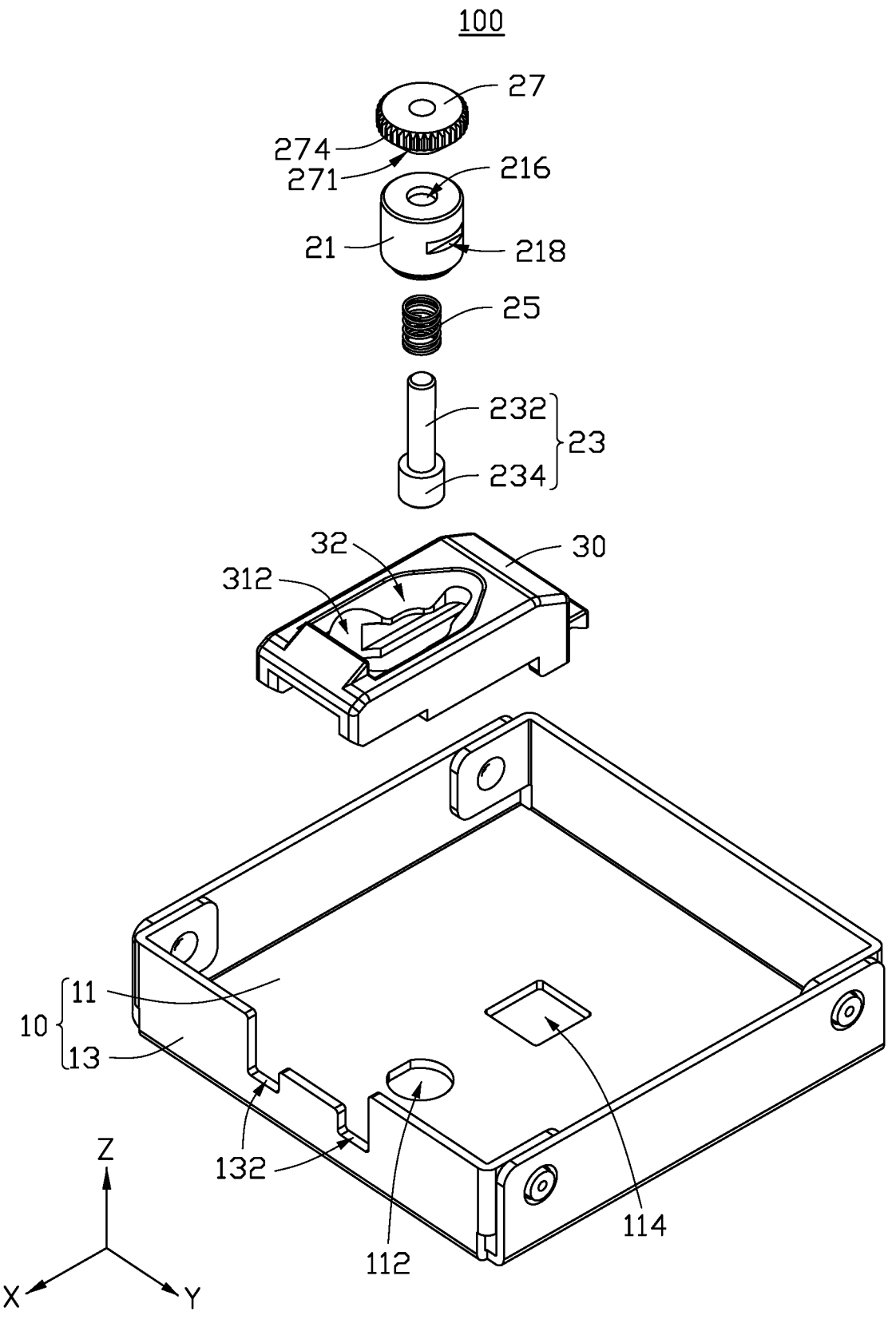
FIG. 3 is an exploded view of the locking assembly of FIG. 1.

In some embodiments, a locking hole 51 is defined on the workpiece 50. Referring to FIG. 3, The locking assembly 100 includes a housing 10, a movable component 20, and an unlocking handle 30. When the locking assembly 100 locks the workpiece 50, the housing 10 is disposed on the workpiece 50, the movable component 20 is movably mounted on the housing 10 and the workpiece 50, and the unlocking handle 30 is mounted on the movable component 20. The movable component 20 can be pulled along a first direction L1, so that the movable component 20 is moved from the locking hole 51 to unlock the workpiece 50 and the housing 10. The unlocking handle 30 can also be pulled from a second direction L2 intersecting with the first direction L1 to drive the movable component 20 move, so that the movable component 20 is removed from the locking hole 51 to unlock the workpiece 50 and the housing 10. In the embodiment, the first direction L1 and the second direction L2 are perpendicular to each other.

The housing 10 includes a bottom plate 11. A first through hole 112 is defined on the bottom plate 11. The first through hole 112 extends through two opposite surfaces of the bottom plate 11. The first through hole 112 corresponds to the locking hole 51.

A coordinate system is used in the present disclosure, which includes an X-axis, a Y-axis, and a Z-axis. The X-axis and the Y-axis cooperatively define an XY plane. The bottom plate 11 is parallel to the XY plane. The housing 10 and the workpiece 50 are stacked along the Z-axis perpendicular to the XY plane.

The movable component 20 includes a sleeve 21, a pin 23, an elastic member 25, and an unlocking cover 27. The movable component 20 extends through the first through hole 112 and the locking hole 51 along the Z-axis.

The sleeve 21 is hollow and substantially columnar. The sleeve 21 includes a first body portion 212 and a blocking portion 214. An accommodating hole 216 is defined on the sleeve 21. The accommodating hole 216 extends through the first body portion 212 and the blocking portion 214. The blocking portion 214 extends from one end of the first body portion 212 toward the accommodating hole 216. That is, an inner diameter of the blocking portion 214 is smaller than an inner diameter of the first body portion 212. A side of the first body portion 212 facing away from the blocking portion 214 can be riveted in the first through hole 112. That is, the sleeve 21 is detachably fixed to the housing 10. The first through hole 112 can be non-circular, so as to prevent the sleeve 21 from rotating relative to the tray 10 after the sleeve 21 is assembled in the tray 10.

The pin 23 includes a rod portion 232 and a cover portion 234. The cover portion 234 is disposed around an outer periphery of the rod portion 232, and the cover portion 234 is coaxial with the rod portion 232. The rod portion 232 extends along the Z-axis relative to the cover portion 234. A diameter of the cap portion 234 is larger than a diameter of the rod portion 232. The pin 23 extends through the accommodating hole 216. The cover portion 234 is disposed at one end of the rod portion 232 facing the workpiece 50. An end of the rod portion 232 facing away from the cover portion 234 can protrude from the accommodating hole 216. The pin 23 is movable relative to the sleeve 21 along the Z-axis. A diameter of the cover portion 234 is equal to or smaller than an inner diameter of the locking hole 51, and the pin 23 can protrude from the housing 10 and be accommodated in the locking hole 51, so that the position of the workpiece 50 is limited. The pin 23 can also be moved out of the locking hole 51 to unlock the workpiece 50.

The elastic member 25 has elasticity. The elastic member 25 can be a spring or made of a polymer with elasticity. In the embodiment, the elastic member 25 is a spring. The elastic member 25 is accommodated in the first body portion 212 and sleeved on the rod portion 232. Two ends of the elastic member 25 resist against the cover portion 234 and the blocking portion 214, respectively.

A diameter of the cover portion 234 is smaller than the inner diameter of the first body portion 212, and the diameter of the cover portion 234 is larger than the inner diameter of the blocking portion 214. When an external force is applied on the pin 23, the cover portion 234 can be accommodated in the first body portion 212 and compress the elastic member 25 disposed in the first body portion 212. When the external force is removed, the pin 23 can return to an initial position after the elastic member 25 rebounds.

The unlocking cover 27 is fixed to an end of the rod portion 232 away from the cover portion 234. The external force is applied on the unlocking cover 27, and the unlocking cover 27 moves and drives the pin 23 to move relative to the sleeve 21.

A knurling 274 is disposed on a periphery of the unlocking cover 27 to facilitate external force applied on the unlocking cover 27.

A first surface 271 of the unlocking cover 27 facing the cover portion 234 is inclined with respect to the Z-axis. In the embodiment, the first surface 271 is a first tapered surface 272. An end of the first tapered surface 272 close to the cover portion 234 is closer to the rod portion 232, and an end away from the cover portion 234 is farther away from the rod portion 232. That is, a top end of the first tapered surface 272 is close to the side where the cover portion 234 is disposed.

The unlocking handle 30 is disposed between the unlocking cover 27 and the sleeve 21. A second surface 32 of the unlocking handle 30 is inclined with respect to the Z-axis. The second surface 32 and the first surface 271 are inclined toward the bottom plate 11 along the Z-axis. The second surface 32 can be connected to the first surface 271.

Figure 4:
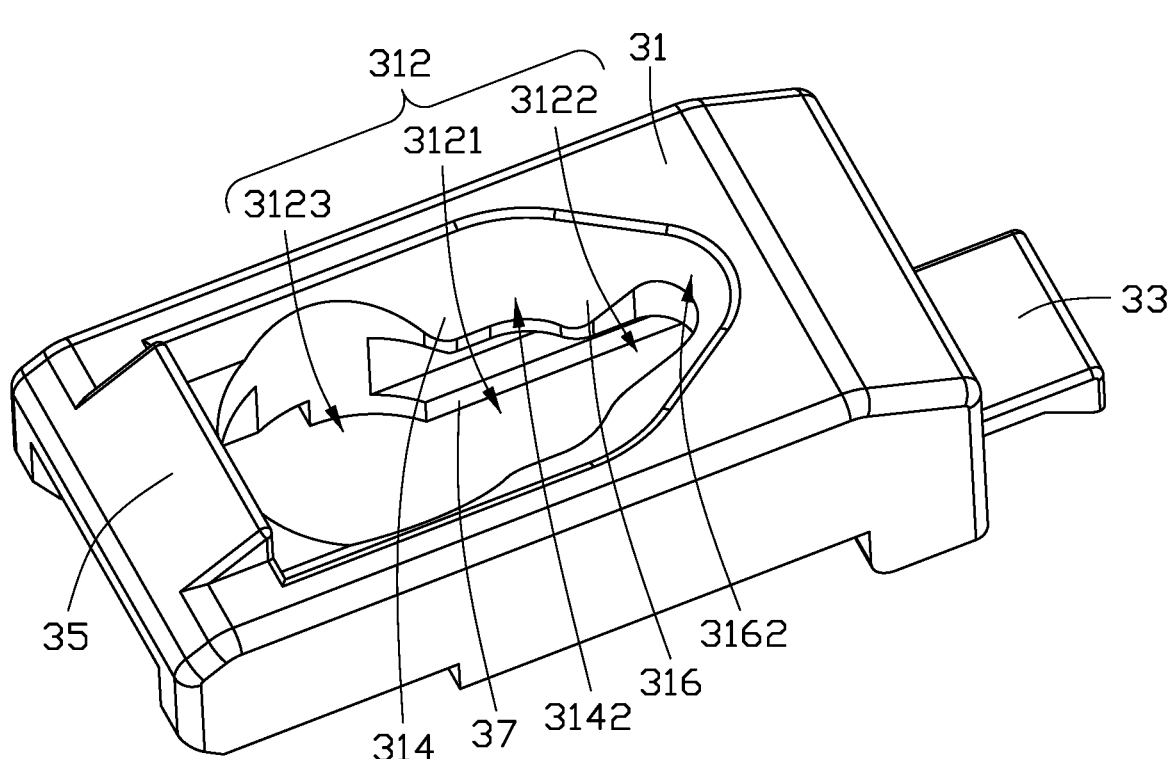
FIG. 4 is a diagrammatic view of an unlocking handle of FIG. 1

Referring to FIG. 4, the unlocking handle 30 includes a second body portion 31, a limiting hook 33, and a hook 35. The limiting hook 33 and the hook 35 are fixed to the second body portion 31. In the embodiment, the second body portion 31, the limiting hook 33, and the hook 35 are integrally formed.

An opening 312 is defined on the second body portion 31. The opening 312 defines a first area 3121 and a second area 3122 disposed along the X-axis and communicating with each other. The sizes of the first area 3121 and the second area 3122 decrease sequentially. The second body portion 31 includes a first extending portion 314 and a second extending portion 316. The first extending portion 314 forms the first area 3121, and the second extending portion 316 forms the second area 3122. The first extension portion 314 protrudes from the first area 3121, and the second extending portion 316 protrudes from the second area 3122. When the unlocking handle 30, the housing 10, and the movable component 20 are assembled together, the first extending portion 314 is disposed between the unlocking cover 27 and the sleeve 21. When the external force is applied to the unlocking handle 30 along the X-axis, the unlocking cover 27 slides along the Z-axis relative to the rod portion 232, and the rod portion 232 extends through the second area 3122.

The opening 312 further includes a third area 3123. The third area 3123 is disposed on a side of the first area 3121 away from the second area 3122 and communicates with the first area 3121. A size of the third area 3123 is larger than the size of the unlocking cover 27. When the movable component 20 is fixed to the housing 10, the unlocking cover 27 can extend through the third area 3123 to sleeve the unlocking handle 30 on the movable component 20.

Surfaces of the first extension portion 314 and the second extending portion 316 facing the unlocking cover 27 are inclined with respect to the Z-axis. The two inclined surfaces can be attached to each other, and the inclined surface of the second extending portion 316 and the inclined surface of the unlocking cover 27 can be attached to each other. In the embodiment, a surface of the first extending portion 314 facing the unlocking cover 27 is a second tapered surface 3142, and a surface of the second extending portion 316 facing the unlocking cover 27 is a third tapered surface 3162. The second tapered surface 3142 is connected to the third tapered surface 3162, and both of the second tapered surface 3142 and the third tapered surface 3162 match the first tapered surface 272 of the unlocking cover 27. When the locking assembly 100 locks the workpiece 50, the first tapered surface 272 is in contact with the second tapered surface 3142. When the external force is applied on the unlocking handle 30, the unlocking handle 30 is displaced relative to the unlocking cover 27, so that the unlocking cover 27 is displaced relative to the sleeve 21. The second tapered surface 3142 abuts against the first tapered surface 272 and causes the first tapered surface 272 move toward the third tapered surface 3162. When the locking assembly 100 and the workpiece 50 are locked, the first tapered surface 272 is in contact with the third tapered surface 3162.

The limiting hook 33 extends along the X-axis relative to the second body portion 31. A second through hole 114 is defined on the housing 10. The position of the limiting hook 33 matches the position of the second through hole 114. When the unlocking handle 30, the housing 10, and the movable component 20 are assembled together, the limiting hook 33 is engaged in the second through hole 114, thereby limiting the position of the unlocking handle 30 and preventing the unlocking handle 30 from rotating around the Z-axis.

The hook 35 is disposed on the second body portion 31 and protrudes relative to the second body portion 31 along the Z-axis. The hook 35 can first be hooked by a tool 40, and the external force along the X-axis is applied to the tool 40, so that the unlocking handle 30 moves relative to the housing 10 and the movable component 20.

When using the locking assembly 100 to lock the workpiece 50, the movable component 20 extends through the first through hole 112 and mount on the housing 10. The sleeve 21 is fixed to the bottom plate 11, the cover portion 234 protrudes from the bottom plate 11 and accommodated in the locking hole 51 of the workpiece 50, and the unlocking cover 27 is disposed on the side of the bottom plate 11 away from the cover portion 234. The unlocking handle 30 extends through the unlocking cover 27 from the first area 3121 of the opening 312, and the unlocking handle 30 is pulled along the X-axis, so that the movable component 20 extends through the unlocking handle 30 from the first area 3121. At this time, the first extending portion 314 is disposed between the unlocking cover 27 and the sleeve 21, the first tapered surface 272 and the second tapered surface 3142 are attached to each other, the limiting hook 33 is disposed in the second through hole 114, and the locking assembly 100 and the workpiece 50 are locked.

Figure 5:
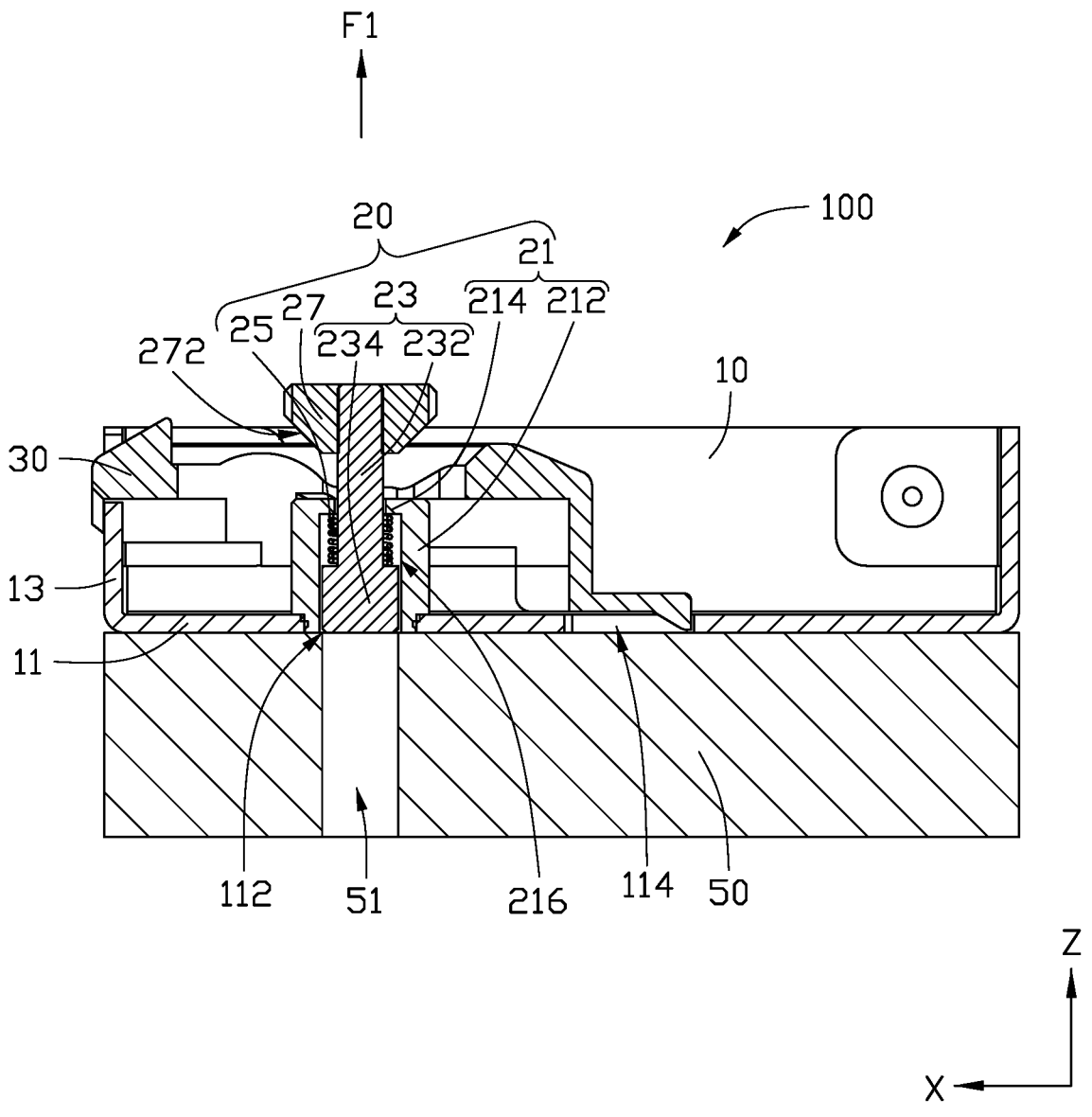
FIG. 5 is a cross-sectional view showing the locking assembly and the workpiece being separated by an external force along a Z-axis.

Referring to FIG. 5, when unlocking the locking assembly 100 and the workpiece 50 along the Z-axis (i.e., the first direction L1), a force F1 is applied to the unlocking cover 27 along the Z-axis. The pin 23 fixedly to the unlocking cover 27 moves along the Z-axis, the cover portion 234 moves relative to the sleeve 21 to enter the first body portion 212, and the cover portion 234 moves out from the locking hole 51, so that the locking assembly 100 and the workpiece 50 are unlocked. At this time, the elastic member 25 in the first body portion 212 is compressed. When the force F1 applied to the unlocking cover 27 is removed, the elastic member 25 rebounds, and the pin 23 causes the cover portion 234 to protrude from the first body portion 212 to return to the original position.

Figure 6:
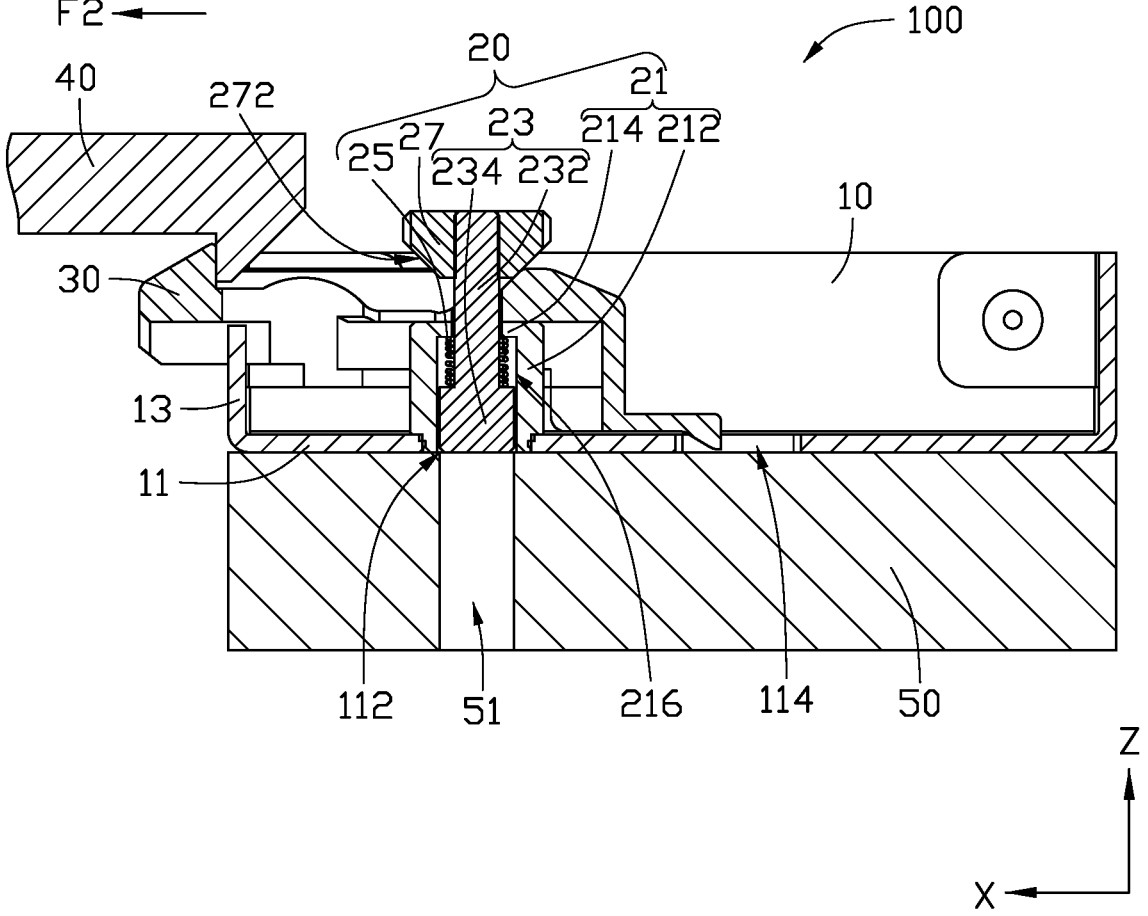
FIG. 6 is a cross-sectional view showing the locking assembly and the workpiece being separated by an external force along an X-axis.

Referring to FIG. 6, when unlocking the locking assembly 100 and the workpiece 50 along the X-axis (i.e., the second direction L2), the hook 35 is first hooked by the tool 40, and a force F2 is applied along the X-axis, so that the unlocking handle 30 tends to move along the X-axis. At this time, the second tapered surface 3142 abuts against the first tapered surface 272 and causes the third tapered surface 3162 to move toward the direction of the first tapered surface 272, so that the unlocking cover 27 moves along the Z-axis. The movement of the unlocking cover 27 drives the pin 23 fixed to the unlocking cover 27 to move synchronously along the Z-axis. The cover portion 234 moves into the first body portion 212 relative to the sleeve 21, so as to move out from the locking hole 51 to unlock the locking assembly 100 and the workpiece 50. At this time, the rod portion 232 is exposed from the sleeve 21, so that the unlocking handle 30 moves relative to the housing 10 along the X-axis, the rod portion 232 enters the second area 3122, and the first tapered surface 272 contacts the third tapered surface 3162. When the force F2 applied to the unlocking handle 30 is removed, the elastic member 25 rebounds, and the cover portion 234 protrudes from the first body portion 212 to return to the original position. During the recovery process of the pin 23 to the initial position, a distance between the unlocking cover 27 and the sleeve 21 gradually decreases. The third tapered surface 3162 causes the first tapered surface 272 move toward the second tapered surface 3142 until the rod portion 232 extends through the first area 3121, and the first tapered surface 272 is attached to the second tapered surface 3142 to realize automatic return. The inclined surfaces in contact with each other are conical surfaces (that is, the first tapered surface 272, the second tapered surface 3142, and the third tapered surface 3162), during the process of pulling the unlocking handle 30, the force when the unlocking handle 30 drives the unlocking cover 27 to move is relatively smooth, which improves user's experience.

Referring to FIG. 3, the housing 10 also includes a side plate 13 extending along the Z-axis relative to the bottom plate 11. At least one limiting groove 132 is defined on the side plate 13. In the embodiment, two limiting grooves 132 are defined on the side plate 13 and disposed along the Y-axis. The first body portion 212 can be engaged in each limiting groove 132, and the limiting grooves 132 can limit the position of the unlocking handle 30 along the X-axis.

Both sides of an outer wall of the sleeve 21 are provided with slide grooves 218, and each slide groove 218 extends along the X-axis. The second body portion 31 also includes a slide rail 37 extending along the X-axis. The slide rail 37 is disposed in the opening 312, and the slide rail 37 is engaged with each slide groove 218. The slide rail 37 can slide relative to the slide groove 218 along the X-axis, so that the unlocking handle 30 can move along the X-axis.

The locking assembly 100 provided in the disclosure includes the housing 10, the movable component 20, and the unlocking handle 30. The movable component 20 includes the sleeve 21, the pin 23 and the unlocking cover 27. The pin 23 is movably disposed in the sleeve 21 so as to confine the workpiece 50 on the housing 10. The unlocking handle 30 is disposed between the sleeve 21 and the unlocking cover 27, and the unlocking handle 30 is provided with the inclined surfaces engaged with the unlocking cover 27. On the one hand, the pin 23 can be pulled directly to unlock the locking assembly 100 and the workpiece 50. On the other hand, the unlocking handle 30 can be pulled, and the inclined surfaces of the unlocking handle 30 engaged with the unlocking cover 27 causes the unlocking cover 27 to drive the pin 23 to move, thereby realizing unlocking the locking assembly 100 and the workpiece 50. The locking assembly 100 provided in the embodiment of the present disclosure can be unlocked with the workpiece 50 in two directions, which improves an application range of the locking assembly 100.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A locking assembly configured to lock a workpiece, the workpiece comprising a locking hole, the locking assembly comprising:

a housing comprising a bottom plate, a first through hole being defined on the bottom plate;

a movable component comprising:

a sleeve extending through the first through hole and mounted on the housing;

a pin accommodated in the sleeve, and a portion of the pin protruding from the housing and configured to accommodate in the locking hole; and an unlocking cover fixed to the pin; and an unlocking handle disposed between the unlocking cover and the sleeve, a first surface of the unlocking cover connected to a second surface of the unlocking handle; each of the first surface and the second surface being inclined toward the bottom plate;

wherein the unlocking cover is configured to be pulled from a first direction to move the pin out of the locking hole; or the unlocking handle is configured to be pulled from a second direction that is orthogonal to the first direction, and the unlocking handle is configured to abut against the unlocking cover to drive the pin to move out of the locking hole, the unlocking handle comprises a handle body portion, an opening is defined on the handle body portion, the opening defines a first area and a second area communicating with each other, and a size of the first area is larger than a size of the second area; when the locking assembly and the workpiece are locked, the movable component extends through the first area; when the locking assembly and the workpiece are unlocked, the movable component extends through the second area; the first surface is a first tapered surface facing the sleeve; the handle body portion comprises a first extending portion and a second extending portion, the first extending portion forms the first area, and the second extending portion forms the second area; the first extending portion has a second tapered surface facing the unlocking cover, the second extending portion has a third tapered surface facing the unlocking cover; when the locking assembly and the workpiece are locked, the first tapered surface is in contact with the second tapered surface; when the locking assembly and the workpiece are unlocked, the first tapered surface is in contact with the third tapered surface.

2. The locking assembly of claim 1, wherein the sleeve comprises a sleeve body portion and a blocking portion, the pin comprises a rod portion and a cover portion, the cover portion is disposed around an outer periphery of the rod portion, the rod portion extends through the blocking portion, and the cover portion is configured to be accommodated in the sleeve body portion.

3. The locking assembly of claim 2, wherein the movable component further comprises an elastic member sleeved on the rod portion and accommodated in the sleeve body portion, and two ends of the elastic member abut against the blocking portion and the cover portion, respectively.

4. The locking assembly of claim 1, wherein the opening further defines a third area, the third area is located on a side of the first area away from the second area and communicates with the first area, and a size of the third area is larger than a size of the unlocking cover.

5. The locking assembly of claim 1, wherein the unlocking handle further comprises a limiting hook, a second through hole is defined on the bottom plate; when the locking assembly and the workpiece are locked, the limiting hook is locked in the second through hole.

6. The locking assembly of claim 1, wherein a slide groove is defined on an outer wall of the sleeve, the handle body portion further comprises a slide rail; the slide rail is disposed in the opening and extends along the second direction, and the slide rail is configured to slide relative to the slide groove along the second direction.

7. The locking assembly of claim 1, wherein the unlocking handle further comprises a hook protruding from the handle body portion along the second direction.

8. The locking assembly of claim 1, wherein the housing further comprises a side plate, the side plate extends along the first direction relative to the bottom plate, a limiting groove is defined on the side plate, the unlocking handle is locked in the limiting groove and configured to move relative to the limiting groove.

* * * * *